US010612476B2

(12) United States Patent
Morganti et al.

(10) Patent No.: US 10,612,476 B2
(45) Date of Patent: Apr. 7, 2020

(54) INTERNAL COMBUSTION ENGINES WHICH UTILIZE MULTIPLE FUELS AND METHODS FOR THE OPERATION OF SUCH

(71) Applicant: Saudi Arabian Oil Company, Dhahran (SA)

(72) Inventors: Kai James Morganti, Dhahran (SA); Yoann Viollet, Dhahran (SA); Robert Andrew Head, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 50 days.

(21) Appl. No.: 15/948,516

(22) Filed: Apr. 9, 2018

(65) Prior Publication Data

US 2019/0309695 A1    Oct. 10, 2019

(51) Int. Cl.
| | | |
|---|---|---|
| *F02D 19/08* | (2006.01) | |
| *F02D 41/00* | (2006.01) | |
| *F02D 19/06* | (2006.01) | |
| *F02P 5/145* | (2006.01) | |
| *F02D 35/02* | (2006.01) | |

(Continued)

(52) U.S. Cl.
CPC ....... *F02D 19/081* (2013.01); *F02D 19/0615* (2013.01); *F02D 19/0655* (2013.01); *F02D 19/084* (2013.01); *F02D 35/028* (2013.01); *F02D 41/0025* (2013.01); *F02P 5/145* (2013.01); *F02D 19/12* (2013.01); *F02D 41/3094* (2013.01); *F02P 5/1527* (2013.01)

(58) Field of Classification Search
CPC ............... F02D 19/081; F02D 19/0615; F02D 41/3094; F02D 19/0655; F02D 41/0025; F02P 5/145
See application file for complete search history.

(56) References Cited

U.S. PATENT DOCUMENTS

| | | |
|---|---|---|
| 6,105,552 A | 8/2000 | Arisawa et al. |
| 6,883,497 B2 | 4/2005 | Wozniak et al. |

(Continued)

FOREIGN PATENT DOCUMENTS

| | | |
|---|---|---|
| DE | 102009028329 A1 | 2/2011 |
| WO | 2016168516 A1 | 10/2016 |

OTHER PUBLICATIONS

International Search Report and Written Opinion dated Dec. 21, 2018 pertaining to International Application No. PCT/US2018/037705 filed Jun. 15, 2018.

(Continued)

*Primary Examiner* — Joseph J Dallo
(74) *Attorney, Agent, or Firm* — Dinsmore & Shohl LLP

(57) ABSTRACT

According to one or more embodiments, an internal combustion engine may be operated by a method which includes one or more of injecting a first fuel and a second fuel into an engine cylinder to form a fuel mixture, and combusting the fuel mixture with a spark plug to translate a piston housed in the engine cylinder and rotate a crank shaft coupled to the piston. The first fuel may comprise a greater octane rating than the second fuel. A target CA50 may correspond to a minimum in specific fuel consumption of the fuel mixture. The spark plug may initiate combustion at a time such that the internal combustion engine operates with an operational CA50 that is within 20 degrees of the target CA50.

22 Claims, 9 Drawing Sheets

(51) Int. Cl.
*F02D 19/12* (2006.01)
*F02P 5/152* (2006.01)
*F02D 41/30* (2006.01)

(56) References Cited

U.S. PATENT DOCUMENTS

| | | | |
|---|---|---|---|
| 6,947,830 | B1 | 9/2005 | Froloff et al. |
| 7,287,509 | B1 | 10/2007 | Brehob |
| 7,302,932 | B2 | 12/2007 | Shelby et al. |
| 7,406,947 | B2 | 8/2008 | Lewis et al. |
| 7,685,996 | B2 | 3/2010 | Brehob |
| 8,439,011 | B2 | 5/2013 | Glugla et al. |
| 8,997,723 | B2 | 4/2015 | Glugla et al. |
| 9,038,596 | B2 | 5/2015 | Glugla et al. |
| 9,267,484 | B2 | 2/2016 | Glugla et al. |
| 2003/0028058 | A1 | 2/2003 | Weissman et al. |
| 2007/0089697 | A1* | 4/2007 | Hara ............... F02D 35/023 123/90.15 |
| 2007/0119391 | A1 | 5/2007 | Fried et al. |
| 2009/0299605 | A1* | 12/2009 | Kweon ............ F02D 19/0628 701/103 |
| 2009/0308146 | A1 | 12/2009 | Gautrot et al. |
| 2010/0065016 | A1* | 3/2010 | Bromberg ........... F02B 17/005 123/295 |
| 2011/0160982 | A1* | 6/2011 | Kumar ............. F02D 41/0025 701/103 |
| 2011/0313641 | A1 | 12/2011 | Glugla et al. |
| 2013/0186366 | A1* | 7/2013 | Reitz ................ F02B 53/10 123/205 |
| 2014/0034013 | A1 | 2/2014 | Leone |
| 2014/0297162 | A1 | 10/2014 | Sumilla et al. |
| 2015/0052877 | A1 | 2/2015 | Leone |
| 2015/0083080 | A1 | 3/2015 | Leone et al. |
| 2015/0240737 | A1 | 8/2015 | Sumilla et al. |
| 2016/0146127 | A1 | 5/2016 | Glugla |
| 2016/0305351 | A1* | 10/2016 | Barta ................. F02D 41/14 |
| 2017/0276098 | A1* | 9/2017 | Tanaka .............. F02D 41/30 |
| 2017/0314499 | A1* | 11/2017 | Urano .............. F02D 41/1475 |
| 2017/0356379 | A1* | 12/2017 | Hotta ............... F02D 35/023 |

OTHER PUBLICATIONS

Kalghatgi et al., "On Knock Intensity and Duperknock in SI Engines", SAE Int. J. Engines / vol. 10, Issue 3, pp. 1051-1063, Jun. 2017.

Morganti et al., "Improving the Efficiency of Conventional Spark-Ignition Engines Using Octane-on-Demand Combustion—Part I: Engine Studies", SAE Technical Paper 2016-01-0679, doi: 10.4271/2016-01-0679, Apr. 5, 2016.

Morganti et al., "Improving the Efficiency of Conventional Spark-Ignition Engines Using Octane-on-Demand Combustion—Part II: Vehicle Studies and Life Cycle Assessment", SAE Technical Paper 2016-01-0683, doi: 10.4271/2016-01-0683, Apr. 5, 2016.

Hall et al., "Combustion Phasing Model for Control of a Gasoline-Ethanol Fueled SI Engine with Variable Valve Timing", 2012 American Control Conference, Fairmont Queen Elizabeth, Montreal, Canada, pp. 1271-1277, Jun. 27-29, 2012.

Viollet et al., "Characterization of High Efficiency Octane-on-Demand Fuels Requirement in a Modern Spark Ignition Engine with Dual Injection System", SAE Technical Paper 2015-01-1265, 2015, doi: 10.4271/2015-01-1265.

\* cited by examiner

INTERNAL COMBUSTION ENGINES WHICH UTILIZE MULTIPLE FUELS AND METHODS FOR THE OPERATION OF SUCH

BACKGROUND

Field

The present disclosure relates to internal combustion engines and, more specifically, to internal combustion engines that utilize multiple fuels.

Technical Background

Petroleum-based fuels are used to power the vast majority of light-duty transportation vehicles, such as automobiles. For example, gasoline, which is relatively inexpensive and widely available for users, is utilized to power the internal combustion engines of automobiles throughout the world. However, the combustion of petroleum-based fuels may release carbon dioxide into the environment, which may be undesirable for a number of reasons. As other more clean sources of energy for use with transportation vehicles may be too costly and underdeveloped, engines are needed which can operate with petroleum-based fuels with increased efficiency, reduced fuel consumption, or both.

BRIEF SUMMARY

As disclosed herein, internal combustion engines which utilize multiple fuel types simultaneously may be utilized to lessen fuel consumption while still operating the engine without knocking, preignition, or both. It has been discovered that internal combustion engines may be run with less fuel consumption by utilizing a low octane fuel source at relatively low and intermediate loads where the octane requirement of the engine is comparatively low, while additionally utilizing a high octane fuel (in a mixture with the low octane fuel) at high loads to mitigate or eliminate knocking which would occur if the low octane fuel were utilized alone. By this method, a limited amount of high octane fuel may be leveraged to enable the engine to be more efficient in its use of the petroleum-based fuel (which may have considerably higher specific energy than commonly available high octane fuels such as methanol and ethanol). For example, disclosed herein are methods and systems that can be used to mitigate preignition in an internal combustion engine operated on two fuels with different anti-knock quality and separate methods of introduction. In one or more embodiments, a low octane fuel, such as a petroleum-derived fuel, is used in conjunction with a high octane fuel, such as an alcohol fuel.

According to one or more embodiments, the method for operating an engine as disclosed herein may include retarding the combustion phasing (with reference to the maximum brake torque timing of a given engine) at constant engine load such that the peak pressure, peak temperature, or both, of the air-fuel mixture inside the cylinder are reduced (compared to operation at maximum brake torque timing). This retardation of combustion phasing may reduce the amount of high octane fuel that is required for the engine to operate without encountering knock, while simultaneously increasing the fraction of the petroleum-based fuel in the overall mixture. The retardation of combustion phasing may additionally reduce the specific fuel consumption and specific carbon dioxide emission. The lower in-cylinder pressure combined with the reduced amount of alcohol fuel required to operate the engine may mitigate abnormal combustion phenomena such as preignition.

According to one or more embodiments, an internal combustion engine may be operated by a method comprising one or more of injecting a first fuel and a second fuel into an engine cylinder to form a fuel mixture, and combusting the fuel mixture with a spark plug to translate a piston housed in the engine cylinder and rotate a crank shaft coupled to the piston. The first fuel may comprise a greater octane rating than the second fuel. A CA50 may be defined as the angular position of the crank shaft when 50 wt. % of the fuel mixture is combusted, where the CA50 may be measured past a top dead center position of the crank shaft, and the CA50 may be a function of the timing of the combustion by the spark plug. A target CA50 may correspond to a minimum in specific fuel consumption of the fuel mixture. The spark plug may initiate combustion at a time such that the internal combustion engine operates with an operational CA50 that is within 20 degrees of the target CA50.

According to one or more additional embodiments, an internal combustion engine may comprise one or more of an engine cylinder, a piston housed within the engine cylinder, a crank shaft coupled with the piston, a first fuel injector that injects a first fuel, a second fuel injector that injects a second fuel, and a spark plug that combusts the fuel mixture to translate the piston and rotate the crank shaft. The second fuel may comprise a greater octane rating than the second fuel, and the first fuel and the second fuel may form a fuel mixture in a combustion chamber of the engine cylinder. A CA50 may be defined as the angular position of the crank shaft when 50 wt. % of the fuel mixture is combusted, where the CA50 may be measured past a top dead center position of the crank shaft, and the CA50 may be a function of the timing of the combustion by the spark plug. A target CA50 may correspond to a minimum in specific fuel consumption of the fuel mixture. The spark plug may initiate combustion at a time such that the internal combustion engine operates with an operational CA50 that is within 20 degrees of the target CA50.

BRIEF DESCRIPTION OF THE DRAWINGS

The following detailed description of specific embodiments of the present disclosure can be best understood when read in conjunction with the following drawings, where like structure is indicated with like reference numerals and in which.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

Described herein are internal combustion engines, and methods for the operation thereof, which utilize a combination of at least two fuels at all or some operating conditions. The engines, and methods for operating such engines, may positively influence both the engine operating conditions as well as the fuel properties so that preignition can be mitigated or eliminated. In one or more embodiments, retarding the combustion phasing (as measured by CA50) may reduce the average peak pressure, which may reduce the likelihood of preignition. Retarding of the combustion phasing may also lead to a reduction in the amount of high octane fuel (such as, alcohol) that may be needed to operate the engine without knocking, which may also reduce the likelihood of preignition. The lesser amount of high octane fuel may also result in improved air-fuel mixture formation. Additionally, lesser amount of high octane fuel may reduce fuel impingement on surfaces of the combustion chamber. Reduced fuel impingement may also cause decreased cylinder bore wear. Without being bound by theory, it is believed that increased wall wetting may result in the removal of oil film on the cylinder lining, which may occur near the piston ring reversal point in the bore (sometimes the worst place for cylinder wear). Therefore reduced fuel impingement may cause reduced wall wetting so that the wear on the cylinder bore may be reduced.

As described herein, knocking in spark-ignition internal combustion engines may refer to an occurrence when combustion of the air/fuel mixture in the cylinder does not start off correctly in response to ignition by the spark plug, but one or more pockets of air/fuel mixture explode outside the envelope of the normal combustion front. Pre-ignition may refer to an occurrence in a spark-ignition engine that is a technically different phenomenon from engine knocking, and describes the event wherein the air/fuel mixture in the cylinder ignites before the spark plug fires. Pre-ignition is initiated by an ignition source other than the spark, such as hot spots in the combustion chamber, a spark plug that runs too hot for the application, or carbonaceous deposits in the combustion chamber heated to incandescence by previous engine combustion. In practical engines, may be during the compression stroke. It is analogous to advancing the spark timing, and the greater this advance, the higher the pressure and the more severe the knock/superknock event that might result. This can cause significant damage to the engine and stop it from operating. Preignition is therefore a limiting factor on improving the efficiency of spark-ignition engines. Each of these phenomena may be mitigated or eliminated by the methods and engine configurations described herein.

Figure 1:
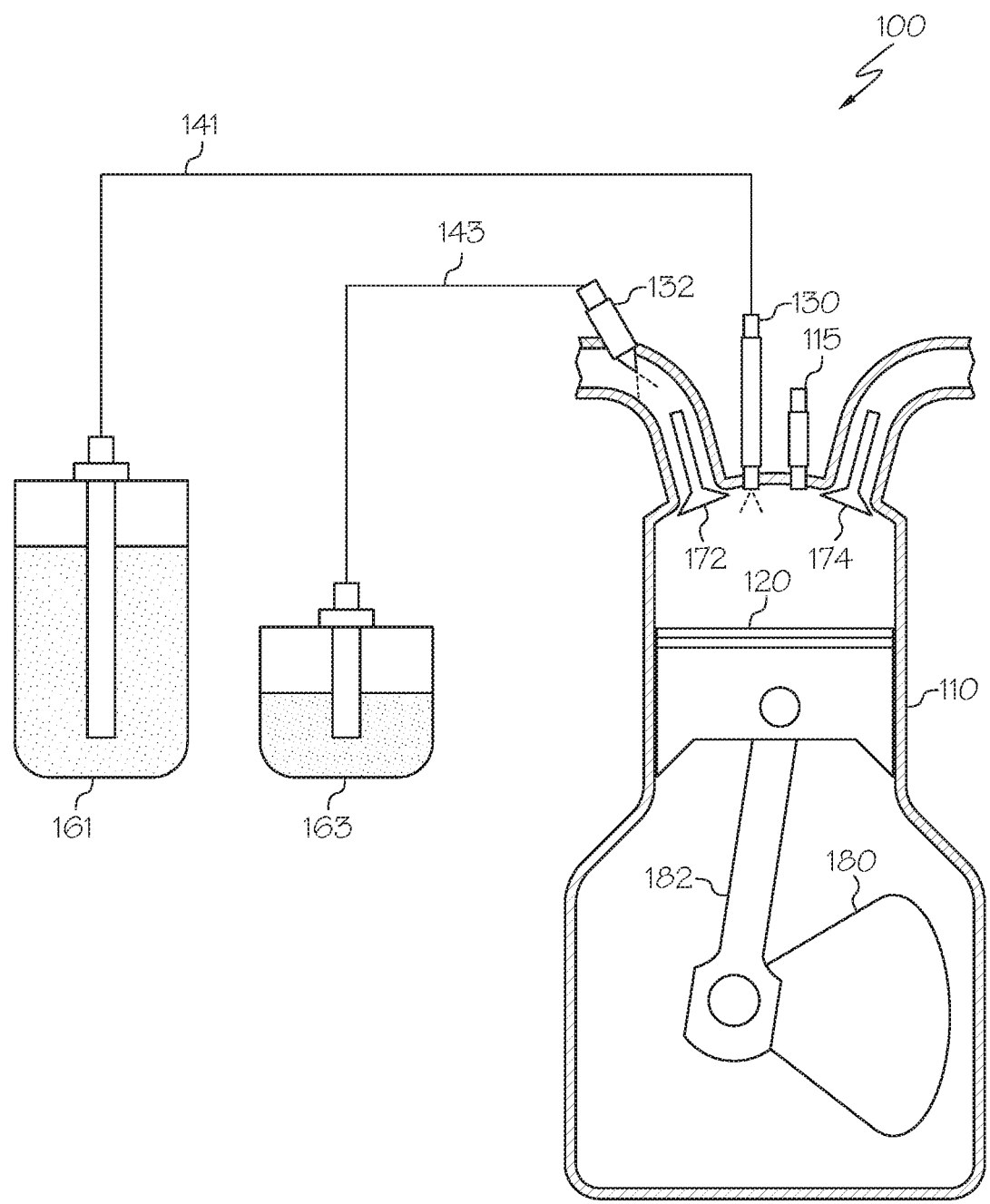
FIG. 1 schematically depicts a cross-sectional view of portion of a cylinder of an internal combustion engine, according to one or more embodiments described herein.

Now Referring to FIG. 1, a schematic illustration of at least a portion of an internal combustion engine 100 is depicted. Specifically, FIG. 1 depicts a single engine cylinder 110 of an internal combustion engine 100. However, as is understood by those having skill in the art, an internal combustion engine 100 may comprise numerous engine cylinders, such as engine cylinder 110, which may be attached to one or more crank shafts, such as crank shaft 180 depicted in FIG. 1.

The internal combustion engine may comprise at least an engine cylinder 110, an intake port 171, an exhaust port 172, and a piston 120. The intake port 171 may be regulated by an intake valve 172 positioned where the intake port 171 connects to the engine cylinder 110. Similarly, the exhaust port 173 may be regulated by an exhaust valve 174. The intake valve 172 and/or the exhaust valve 174 may be connected to one or more cams or camshafts (not depicted in FIG. 1) which may serve to keep the intake valve 174 and/or the exhaust valve 174 in time with the engine operation. The piston 120 may be coupled to a crankshaft 180 by connecting rod 182.

The volume defined on the top and sides by the engine cylinder 110 and on the bottom by the piston 120 is referred to as the combustion chamber 122. The intake port 171 and the exhaust port 173 are fluidly coupled with the combustion chamber 122 such that fluids may enter and exit the combustion chamber 122 at various times throughout the engine cycle. A spark plug 115 is positioned at the combustion chamber 122 to provide combustion initiation in timed bursts.

According to the embodiment depicted in FIG. 1, a high octane fuel injector 132 may inject high octane fuel into the intake port 171, which will ultimately enter the combustion chamber 122. As described herein, a fuel injector which injects a fuel into the intake port 171 is referred to as a "port fuel injector." As depicted in FIG. 1, a low octane fuel injector 130 may inject low octane fuel directly into the combustion chamber 122. As described herein, a fuel injector which injects a fuel directly into the combustion chamber 122 is referred to as a "direct fuel injector." The low octane fuel injector 130 and the high octane fuel injector 132 may be supplied with respective fuels from a low octane fuel supply 161 and a high octane fuel supply 163. The low octane fuel supply 161 may be fluidly connected to the low octane fuel injector 130 via connection line 141. Similarly, the high octane fuel supply 163 may be fluidly connected to the high octane fuel injector 132 via connection line 143.

Figure 2:
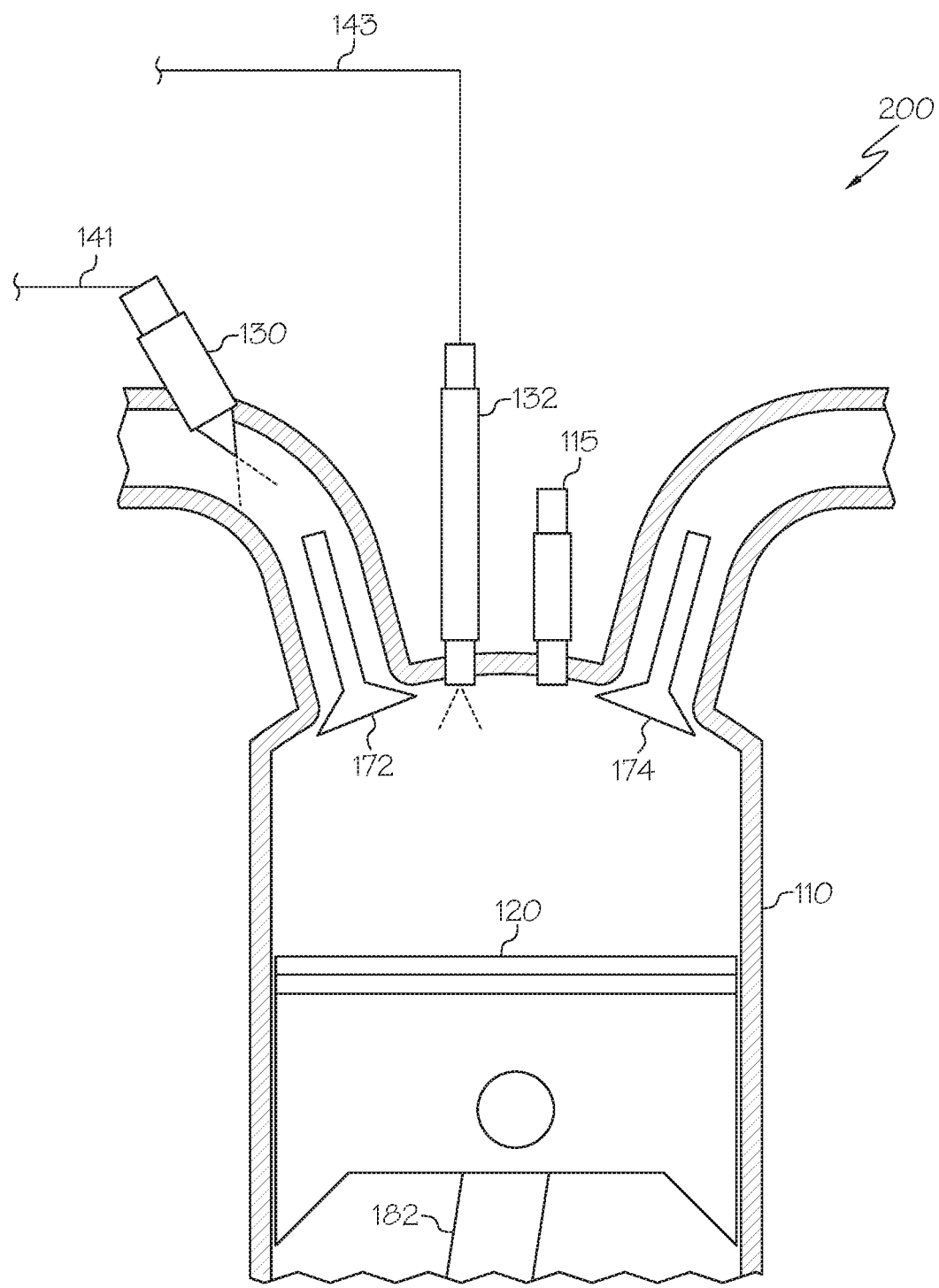
FIG. 2 schematically depicts a cross-sectional view of portion of a cylinder of an another internal combustion engine, according to one or more embodiments described herein.

Now referring to FIG. 2, in another embodiment the high octane fuel injector 132 is a direct injector which feeds high octane fuel into the combustion chamber 122. As shown in FIG. 2, the low octane fuel injector 130 may be an indirect injector which feeds low octane fuel into the intake port 171.

Figure 3A:
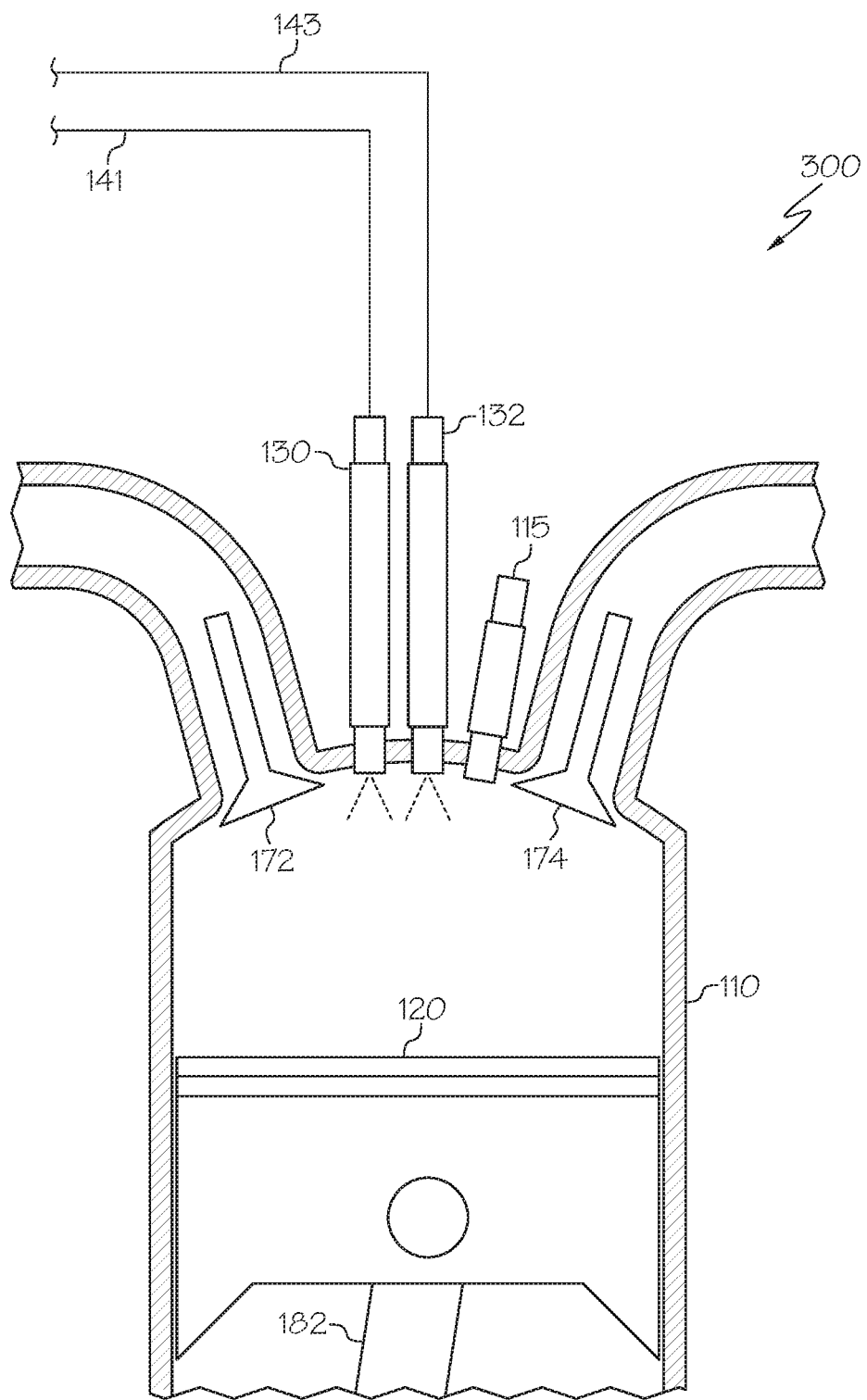
FIG. 3A schematically depicts a cross-sectional view of portion of a cylinder of an another internal combustion engine, according to one or more embodiments described herein.
Figure 3B:
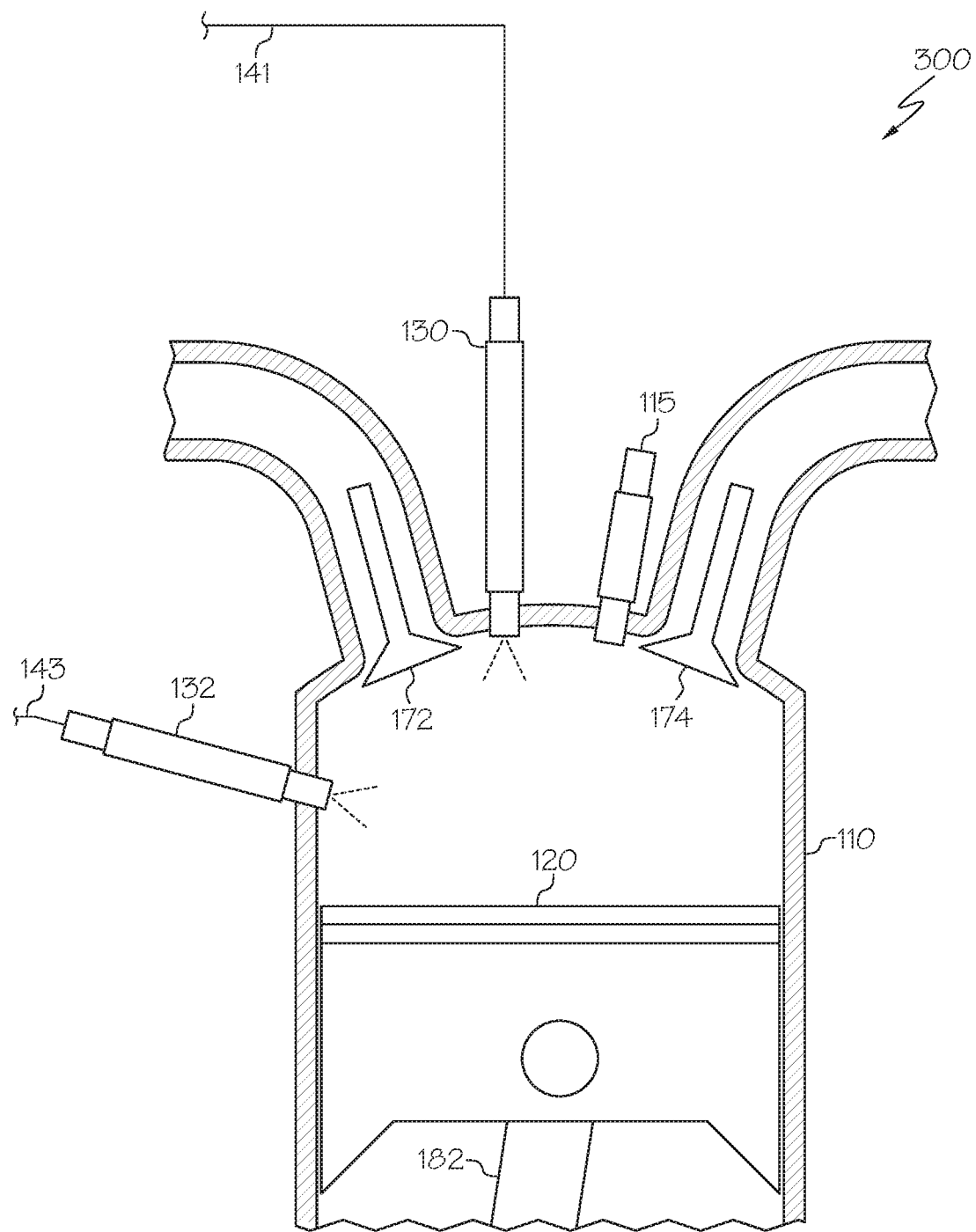
FIG. 3B schematically depicts a cross-sectional view of portion of a cylinder of an another internal combustion engine, according to one or more embodiments described herein.

FIGS. 3A and 3B depict additional embodiments, where the high octane fuel injector 132 and the low octane fuel injector 130 are both direct fuel injectors. In such an embodiment, independent control of the injection of high octane fuel and low octane fuel may be present. FIG. 3A depicts an embodiments where both direct fuel injectors are located on the cylinder head (for example, at or near the spark plug 115). The embodiment of FIG. 3B has one fuel injector positioned at the cylinder head and one fuel injector positioned on the side of the cylinder (sometimes referred to as a side-mounted direct injector).

It should be understood that, as described herein, "low octane fuel" may refer to any fuel which has a lower octane rating (or octane number) than the "high octane fuel." As such, unless specified, the low octane fuel and high octane fuel may have any octane number as long as the relationship between the two is satisfied. An octane rating, or octane number, is a standard measure of the performance of an engine or aviation fuel. The higher the octane number, the more compression the fuel can withstand before detonating (igniting). In broad terms, fuels with a higher octane rating may be used in high performance gasoline engines that require higher compression ratios. As described herein, "octane number" refers to the research octane number (RON).

According to one or more embodiments, the low octane fuel may comprise gasoline. For example, the low octane fuel may comprise at least 50 wt. %, at least 60 wt. %, at least 70 wt. %, at least 80 wt. %, at least 90 wt. %, at least 95 wt. %, at least 99 wt. %, or even at least about 99.9 wt. % gasoline. The low octane fuel may have an octane number of 98 or less, 90 or less, or even 80 or less. In additional embodiments, the low octane fuel may have an octane number of from 60 to 98, such as from 91 to 95.

According to one or more embodiments, the high octane fuel may comprise one or more alcohols, such as methanol or ethanol. For example, the low octane fuel may comprise at least 50 wt. %, at least 60 wt. %, at least 70 wt. %, at least 80 wt. %, at least 90 wt. %, at least 95 wt. %, at least 99 wt. %, or even at least about 99.9 wt. % of total alcohols, methanol, ethanol, water or a combination of any two or more of water, methanol, or ethanol. The high octane fuel may have an octane number of at least 91, at least 95, or even at least 98. In additional embodiments, the high octane fuel may have an octane number of from 91 and 130, such as from 105 to 115, such as 110.

According to one or more embodiments, the high octane fuel may be methanol, and the weight percent of methanol in the fuel mixture (that is, the amount of methanol divided by the sum of methanol and gasoline) may be from 0 wt. % to 40 wt. %. In another embodiment, the high octane fuel may be ethanol, and the weight percent of ethanol in the fuel mixture may be from 10 wt. % to 50 wt. %. The reminder of the fuel mixture may be gasoline. It is contemplated that other ranges of weight percent of methanol or ethanol may be utilized based on the octane numbers of the low and high octane fuels or the compression ration of the engine. For example, if the compression ratio is increased, the weight percent of methanol or ethanol may be greater. Without being bound by theory, in some embodiments, the percentage of alcohol may be greater than 50 wt. %, greater than 75 wt. %, greater than 95 wt. %, or even 100 wt. %.

The internal combustion engine 100 may operate by repeated combustion of a fuel mixture which comprises the high octane fuel and the low octane fuel. The combustion of the fuel mixture, commenced by the spark plug 155, may translate the piston 120 between an uppermost and lowermost position. The movement of the piston 120 may rotate the crank shaft 180. The crank shaft 180 may rotate though a top dead center position (corresponding to the uppermost position of the piston 120) and a bottom dead center position (corresponding to the lowermost position of the piston 120). In one or more embodiments, the internal combustion engine may operate as a four stroke engine, although other engine configurations are contemplated. In such an embodiment, intake, compression, power, and exhaust strokes may cycle. In the intake stroke, the piston may move downward and air and/or fuel may enter the combustion chamber 122 through the intake port 171. In the compression stroke, the air and fuel are compressed as the piston 120 moves upward. In the power stroke, the piston is forced downward by combustion, which is caused by a spark from the spark plug 115. The optimal combustion timing (by ignition of the spark plug) based on utilizing the maximum thermal efficiency of a given engine is referred to as the maximum brake torque timing. In the exhaust stroke, the piston moves upwardly to force exhaust gases (products of the combustion reaction) out of the combustion chamber 122 through the exhaust port 173.

According to one or more embodiments, the internal combustion engine 100 may operate by utilizing only the low octane fuel while running at relatively low loads. The internal combustion engine 100 may utilize the mixture of the high octane fuel and the low octane fuel at greater loads. For example, at low engine loads, gasoline may be sufficient for operation, while at higher engine loads, alcohol is needed as an additive to increase the octane rating of the fuel that is combusted. The separate fuel injectors 130, 132 for the high octane fuel and low octane fuel may allow for on-demand injection of high octane fuel at some operating conditions while utilizing only the low octane fuel at other operating conditions.

According to one or more embodiments, a CA50 may be defined as the crank angle at which 50 wt. % of the fuel mass has been burned and is defined with respect to the top dead center (TDC) position of the piston unless otherwise specified. The CA50 may be representative of the timing of the spark ignition of the combustion in the engine. That is, the timing of the spark may determine the CA50. For each engine configuration and operating conditions a maximum brake torque CA50 can be determined, which is the CA50 at which maximum thermal efficiency of the engine is utilized.

In the embodiments disclosed herein, engine may operate at a CA50 timing which is later than the CA50 corresponding to the maximum brake torque. This delayed timing of spark ignition may be referred to herein as retarding of the combustion phasing or spark timing. Retarding of the combustion phasing may result in lower engine pressures and temperatures during ignition. Additionally, retarding of the combustion phasing (i.e., utilizing a greater CA50 than the maximum brake torque CA50) may allow the engine to be operated with lower octane fuel than at lesser CA50 values. For example, operating the engine with a CA50 corresponding to the maximum brake torque may require a higher octane fuel mixture than operating the engine at a CA50 greater than that corresponding to the maximum brake torque.

In one or more embodiments, the engine may be operated with a mixed fuel that has at or near the minimum octane rating needed to prevent knocking at the CA50 utilized for engine operation. That is, for a given CA50 engine timing, an appropriate amount of high octane fuel may be combined with a remainder of low octane fuel to provide a mixed fuel with sufficient octane number such that knocking does not occur. For the operational CA50 (the CA50 at which the engine is operated), the minimum octane rating of the fuel mixture may be determined based on experimentation. Based on the octane number of the high octane fuel and the low octane fuel used, the minimum weight percent of high octane fuel needed to prevent knocking at the operational CA50 can be determined. In one or more embodiments, the engine may be operated with a weight percentage of high octane fuel which is within 20 wt. %, within 15 wt. %, within 10 wt. %, within 5 wt. %, within 2 wt. %, or even within 1 wt. % of this minimum weight percentage needed to prevent engine knocking.

In one or more embodiments, the low octane fuel has a greater lower heating value than the high octane fuel. Therefore, with increasing CA50, the lower heating value of the mixed fuel may be increased (since at greater CA50, more low octane fuel may be utilized). As used herein, the "lower heating value" of a fuel is defined as the amount of heat released by combusting a specified quantity (initially at 25° C.) and returning the temperature of the combustion products to 150° C., which assumes the latent heat of vaporization of water in the reaction products is not recovered. The lower heating value is sometimes referred to as the net calorific value.

According to embodiments, while the lower heating value of the fuel mixture may increase with increasing operational CA50, the engine efficiency may be diminished with increasing operational CA50. Therefore, since the minimum fuel consumption of the engine may be a function of both the engine efficiency and the fuel mixture utilized (e.g., the weight percentage of high octane fuel utilized), the specific fuel consumption may be minimized at a particular CA50, referred to herein a "target CA50." At the target CA50, the minimum fuel consumption is minimized, such that the diminished thermal efficiency of the engine with increasing CA50 is maximally offset by the increased lower heating value of the mixed fuel at higher CA50 values.

According to one or more embodiments, internal combustion engine 100 may operate with an operational CA50 that is within 20 degrees of the target CA50. For example, the operational CA50 may be within 15 degrees, within 10 degrees, within 8 degrees, within 6 degrees, within 4 degrees, or even within 2 degrees of the target CA50. Such operation may sufficiency minimize the specific fuel consumption of the internal combustion engine which utilizes a high octane fuel additive to prevent engine knocking at the operational CA50.

According to one or more embodiments, the engines disclosed herein may operate with a CA50 of from 6 degrees or 8 degrees to 35 degrees, such as from 14 degrees to 23 degrees. For example, the operational CA50 may be from 8 degrees to 14 degrees, from 14 degrees to 17 degrees, from 17 degrees to 20 degrees, or from 20 degrees to 23 degrees, from 23 degrees to 30 degrees, from 30 degrees to 35 degrees, or any combination thereof. The operational CA50 may depend on the load of the engine operation and/or on the low octane and high octane fuels used. For example, Table 1 shows contemplated CA50 values for various engine conditions where the high octane fuel may be ethanol, methanol, or a combination thereof including or void of water.

TABLE 1

| Load (bar) | RPM | High Octane Fuel wt. % | CA50 range |
| --- | --- | --- | --- |
| 4-10 | 1000-5000 | 0-10 | 6-30 |
| 9-13 | 1000-5000 | 0-20 | 6-30 |
| 11-15 | 1000-5000 | 10-35 | 6-35 |
| 14-18 | 1000-5000 | 15-50 | 6-40 |
| 16-20 | 1000-5000 | 20-45 | 6-40 |
| 18-35 | 1000-5000 | 25-100 | 6-40 |

Without being bound by theory, it is believed that engines utilizing the operational methods described herein may have one or more advantages over identical engines running with maximum break torque timing. For example, the engine may have decreased preignition, the average peak pressure in the engine may be decreased; the engine may operate without knocking with lesser high octane fuel; the engine may have increased mixing between air and fuel; the engine may have reduced fuel impingement in the cylinder; or the engine may have decreased wear.

EXAMPLES

Various embodiments of internal combustion engines and the operation thereof will be further clarified by the following examples. The examples are illustrative in nature, and should not be understood to limit the subject matter of the present disclosure.

To demonstrate how the internal combustions engines of the present disclosure can mitigate abnormal combustion phenomena, two fuel engine systems were experimentally analyzed.

Example 1

An engine system running at 2500 rpm and 13 bar was analyzed at varying CA50 with ethanol and gasoline utilized as the high octane fuel and the low octane fuel, respectively. The gasoline utilized in the examples was a Saudi Arabian Gasoline Blendstock for Oxygenated Blending (BOB) having a RON of 90. For the engine of Example 1, the maximum brake torque was measured as about 8 degrees aTDC (after top dead center).

Figure 4:
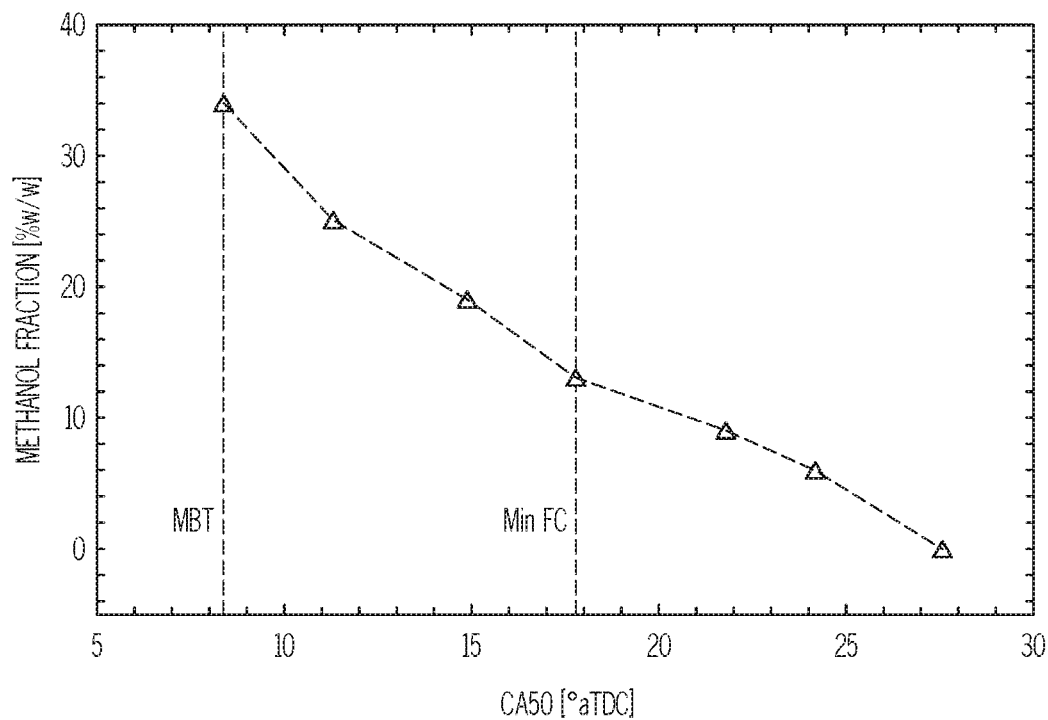
FIG. 4 graphically depicts experimental results of methanol fraction as a function of crank angle at 50 wt. % combustion (CA50), according to one or more embodiments described herein.

The engine was analyzed at CA50 greater than 8 degrees to determine the required amount of high octane fuel required to prevent knocking at a given CA50. FIG. 4 depicts the weight ratio of methanol needed in the engine at varying CA50 for knock prevention. The methanol fraction was indirectly established based on the minimum octane requirement of the engine at a given combustion phasing. That is, knocking would occur with any less methanol at a given CA50 shown in FIG. 4. For this operating condition, the octane requirement at the most retarded combustion phasing (CA50 of about 28 degrees aTDC) is sufficiently low for the engine to be operated on only the gasoline fuel. As would be expected, the engine required a higher octane fuel mixture to be run without knocking at CA50 approaching the maximum brake torque CA50.

Figure 5:
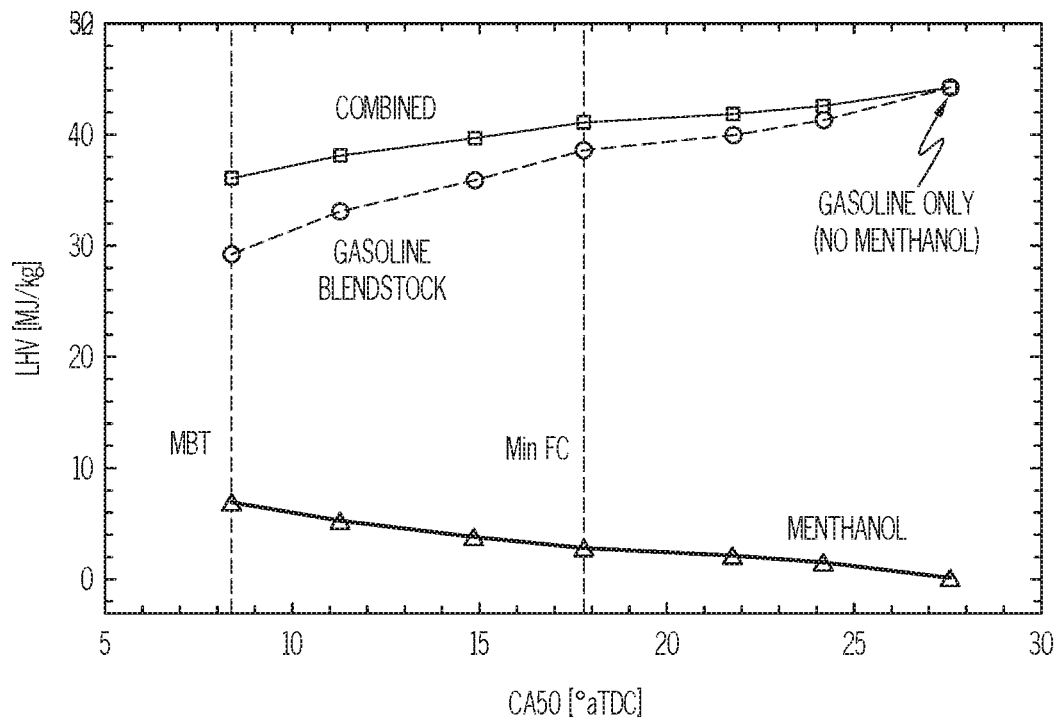
FIG. 5 graphically depicts experimental results of lower heating value of a gasoline fuel, methanol fuel, and the fuel mixture as a function of CA50, according to one or more embodiments described herein.

Additionally, FIG. 5 depicts the lower heating value at varying phase angles for the methanol and the gasoline, accounting for the methanol to gasoline ratio requirements shown in FIG. 4. FIG. 5 additionally shows a combined lower heating value for the fuel mixture. As is depicted in FIG. 5, fuel mixtures with lower octane numbers (capable of being utilized at great CA50 phasing) have higher energy content than the higher octane number fuel mixtures.

Figure 6:
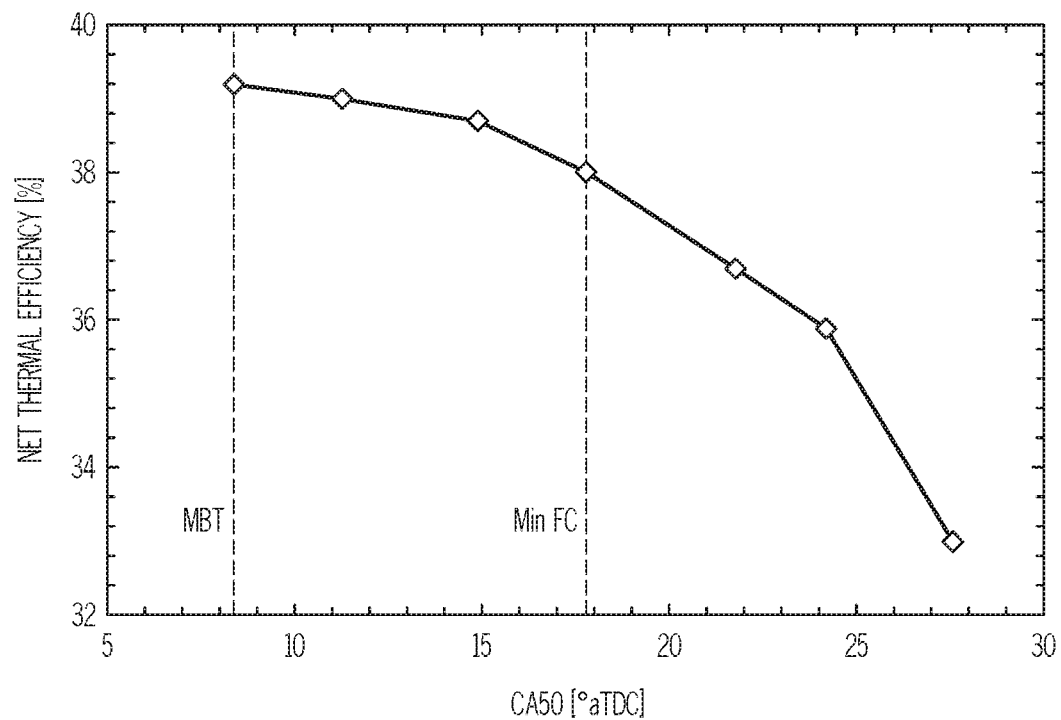
FIG. 6 graphically depicts experimental results of net thermal efficiency as a function of CA50, according to one or more embodiments described herein.

FIG. 6 depicts the measured net thermal efficiency of the engine at varying CA50 timing. The maximum engine efficiency occurs at the maximum brake torque, and net thermal efficiency decreases with increasing CA50 phasing (moving away from the maximum brake torque timing).

Figure 7:
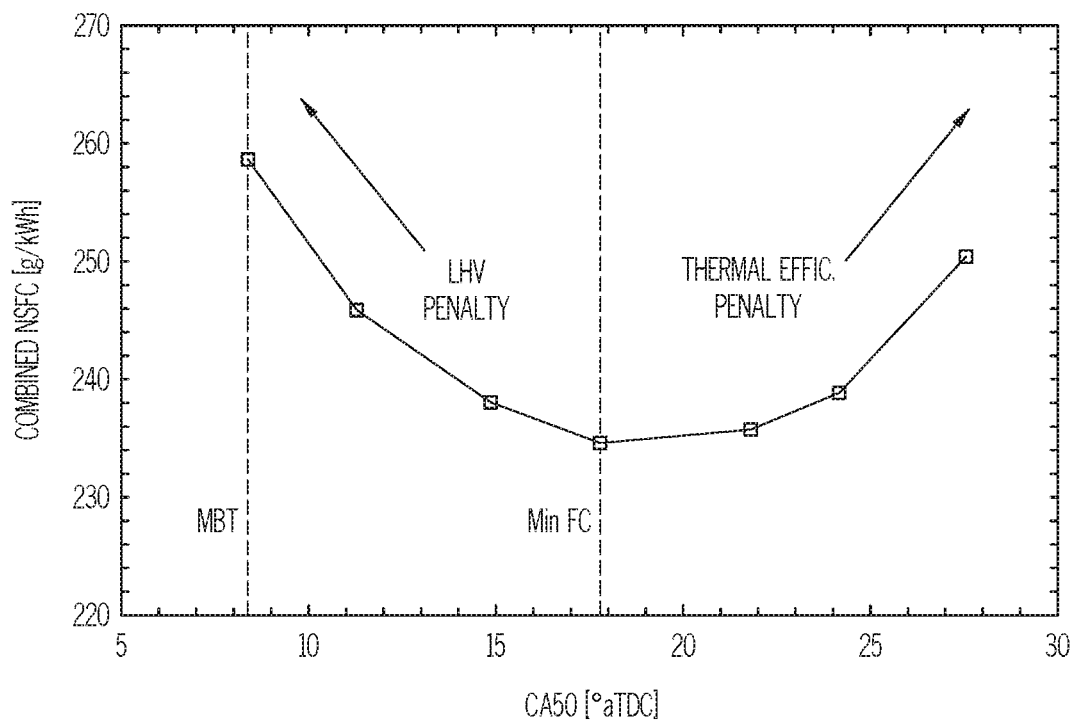
FIG. 7 graphically depicts experimental results of net specific fuel consumption of a fuel mixture as a function of CA50, according to one or more embodiments described herein.

FIG. 7 depicts the net specific fuel consumption (NSFC) at varying CA50 timing. The competing effects of thermal efficiency and lower heating value ultimately determine that further advancing the combustion phasing will only benefit the combined specific fuel consumption if the incremental improvement in thermal efficiency more than offsets the incremental reduction in the combined energy density of the fuel. This trade-off produces a local minimum within the combined specific fuel consumption curve of FIG. 7. This is caused by the incremental improvement in the thermal efficiency continuing to decline as the combustion phasing is advanced towards MBT spark timing. Maximizing this trade-off between the thermal efficiency and fuel energy density reduces the combined specific fuel consumption by 9% with respect to the peak efficiency operating condition (CA50 of about 8 degrees aTDC). The amount of methanol required to suppress knock is also reduced by more than 60%.

For example, operation at CA50 at about 28 degrees (with all gasoline as the fuel) represents the fuel with the lowest octane quality but also the highest energy density. To advance the combustion phasing, the amount of methanol must be increased while the amount of gasoline blendstock is simultaneously reduced to maintain stoichiometric combustion. This in turn increases the thermal efficiency of the engine via more optimized combustion phasing, but also reduces the combined energy density of the fuel.

Example 2

Figure 8:
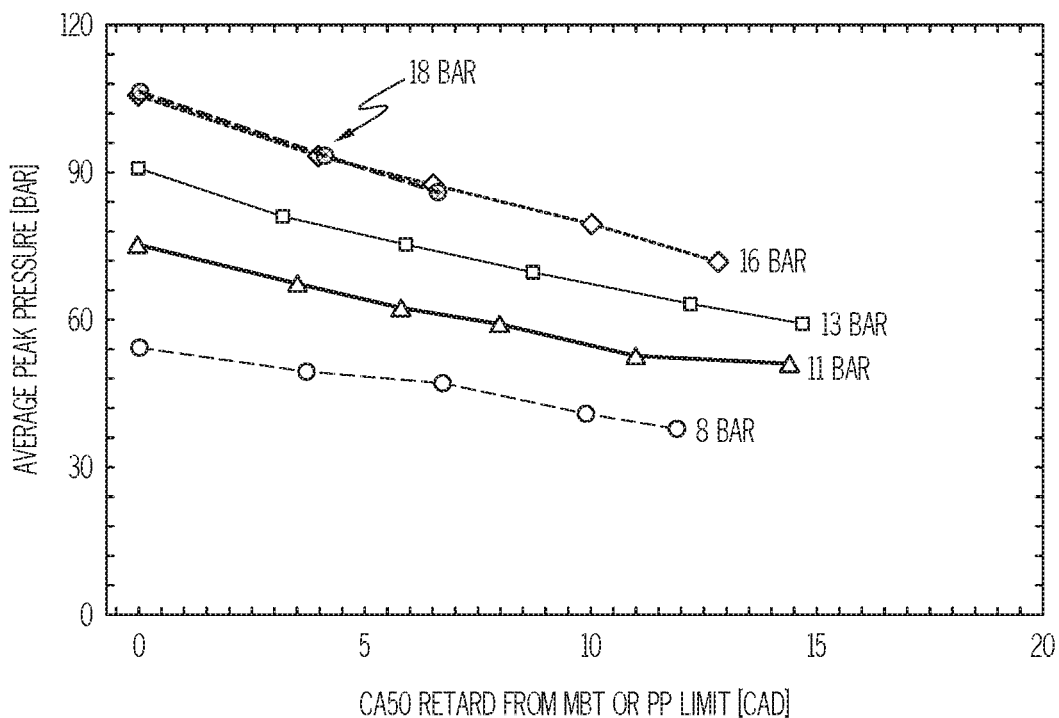
FIG. 8 graphically depicts experimental results of average peak pressure as a function of CA50 for varying engine loads, according to one or more embodiments described herein.
Figure 9:
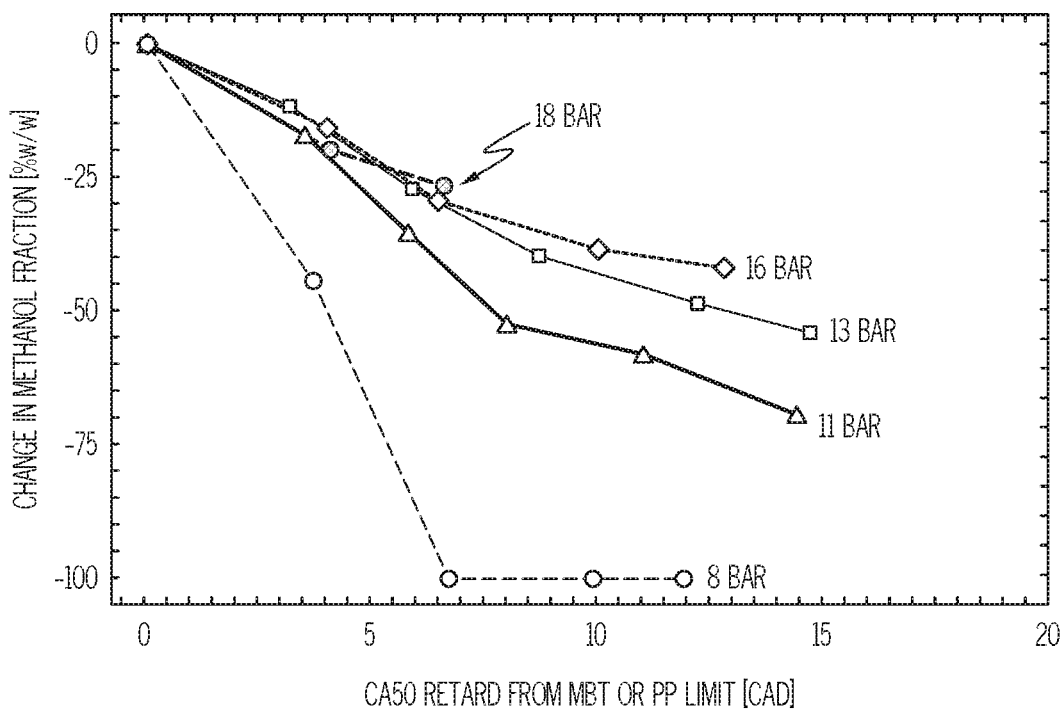
FIG. 9 graphically depicts experimental results of change in methanol fraction as a function of CA50 for varying engine loads, according to one or more embodiments described herein.

Further testing was conducted on the engine and conditions of Example 1, but the engine load was varied at 18 bar, 16 bar, 13 bar, 11 bar, and 8 bar and the engine ran constantly at 1500 rpm. MBT at CA50 of about 8 degrees could be maintained at all loads below this level with the engine operated on only the gasoline (that is, without octane enrichment by the high octane fuel). FIG. 8 shows the average peak pressure as a function of CA50 past maximum break torque or the cylinder pressure limit (if relevant). Additionally, FIG. 9 shows the change in methanol fraction as a function of CA50, again standardized to degrees past maximum break torque or the cylinder pressure limit (if relevant). The trade-off between thermal efficiency and fuel energy density is enabled by the relationship between the combustion phasing and the peak cylinder pressure. Retarding the combustion phasing reduces the peak cylinder pressure, which effectively lowers the octane requirement of the engine. This in turn reduces the amount of methanol required to suppress knock. For example, the methanol fraction can be reduced by 100% and 50% by retarding the combustion phasing by just six crank angle degrees (CAD) at the two lowest engine loads (11 bar and 8 bar). These benefits diminish with increasing engine load, but still exceed 25% at the highest load considered in this experiment.

Example 3

Figure 10:
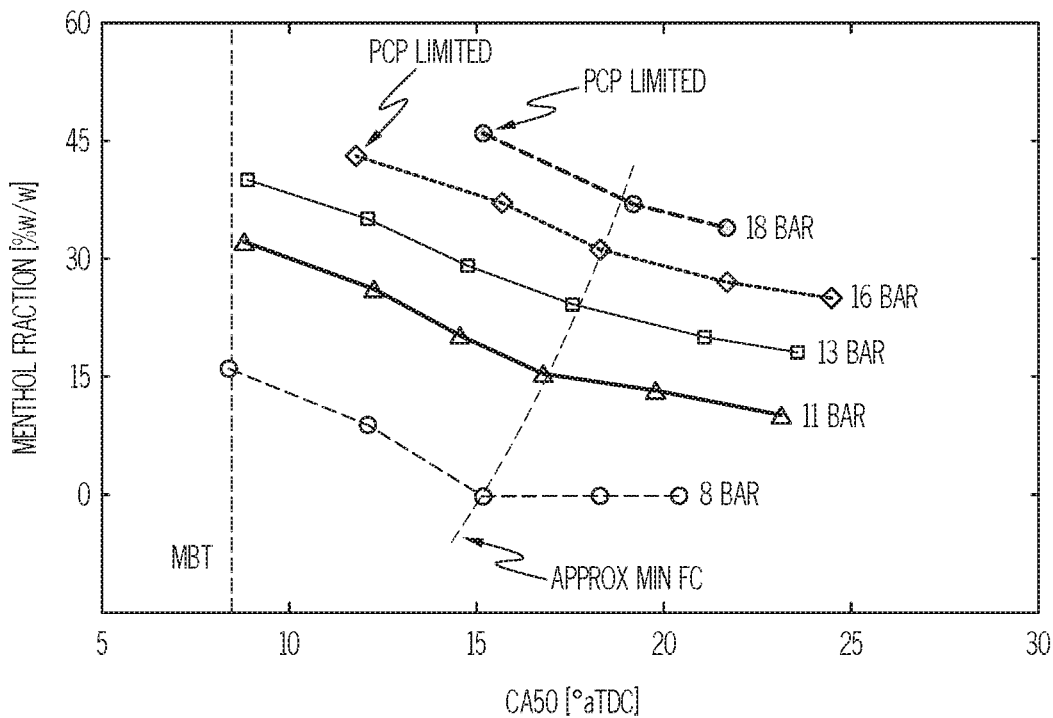
FIG. 10 graphically depicts experimental results of methanol fraction as a function of CA50 for varying engine loads, according to one or more embodiments described herein.
Figure 11:
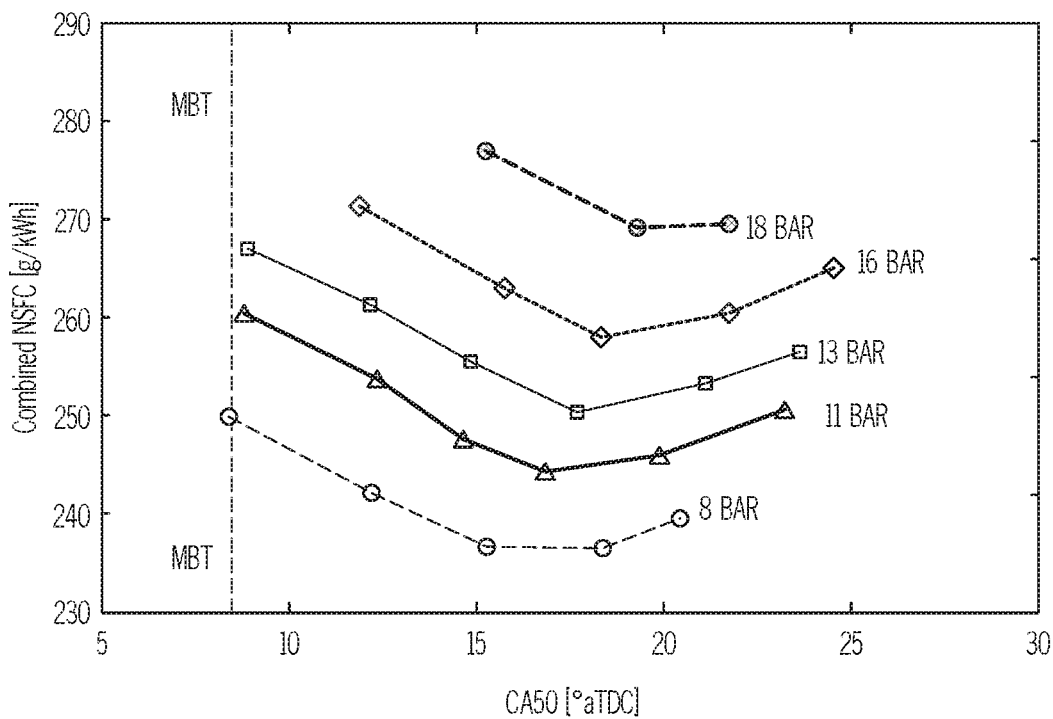
FIG. 11 graphically depicts experimental results of net specific fuel consumption of the fuel mixture as a function of CA50 for varying engine loads, according to one or more embodiments described herein.

An engine utilizing methanol and gasoline and running at 1500 rpm under varying engine loads (18 bar, 16 bar, 13 bar, 11 bar, and 8 bar) was experimentally analyzed at varying CA50 values, where methanol content in the fuel mixture was minimized to the amount needed to prevent knocking. FIG. 10 shows the methanol fraction as a function of CA50 for the various engine loads, and FIG. 11 shows the net specific fuel consumption of the fuel mixture as a function of CA50 for the various engine loads.

Example 4

Figure 12:
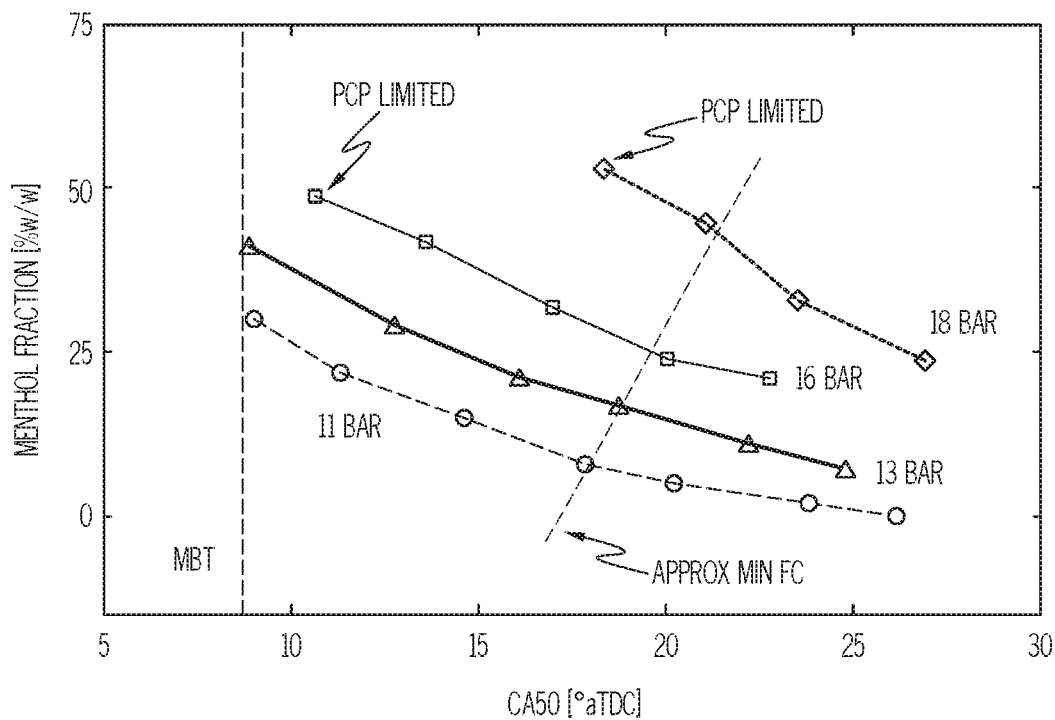
FIG. 12 graphically depicts experimental results of methanol fraction as a function of CA50 for varying engine loads, according to one or more embodiments described herein.
Figure 13:
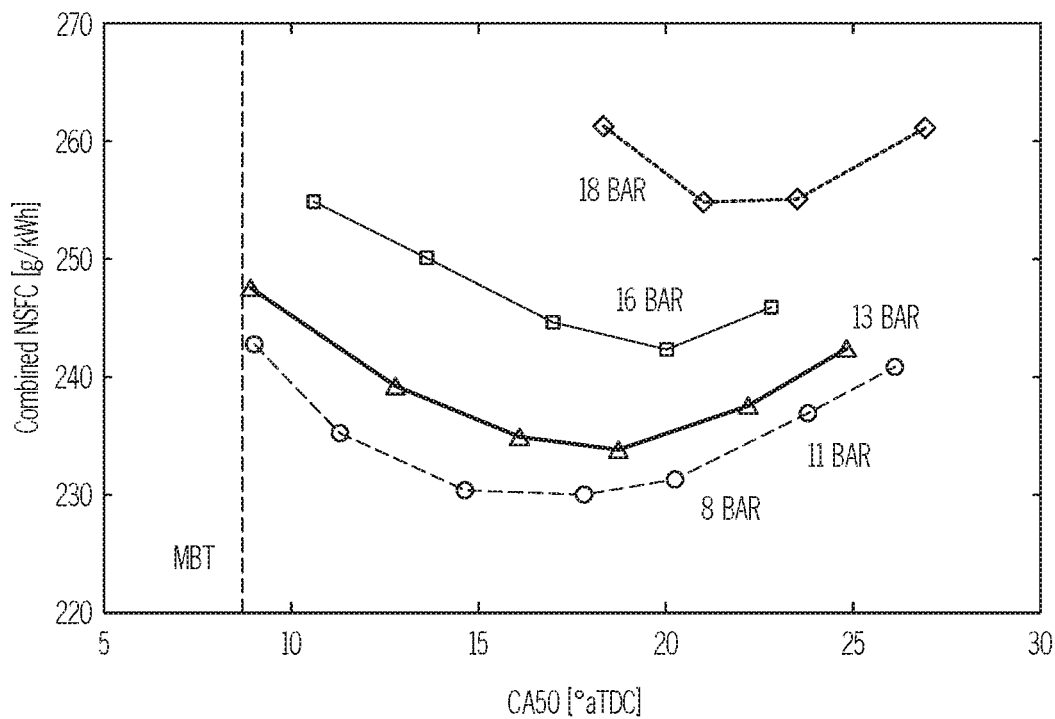
FIG. 13 graphically depicts experimental results of net specific fuel consumption of the fuel mixture as a function of CA50 for varying engine loads, according to one or more embodiments described herein.

An engine utilizing ethanol and gasoline and running at 2500 rpm under varying engine loads (18 bar, 16 bar, 13 bar, and 11 bar) was experimentally analyzed at varying CA50 values, where ethanol content in the fuel mixture was minimized to the amount needed to prevent knocking. FIG. 12 shows the methanol fraction as a function of CA50 for the various engine loads, and FIG. 13 shows the net specific fuel consumption of the fuel mixture as a function of CA50 for the various engine loads.

What is claimed is:

1. A method of operating an internal combustion engine, the method comprising:
   passing a first fuel and a second fuel into an engine cylinder to form a fuel mixture, wherein the first fuel comprises a greater octane rating than the second fuel; and
   combusting the fuel mixture with a spark plug to translate a piston housed in the engine cylinder and rotate a crank shaft coupled to the piston;
   wherein:
      a CA50 is defined as the angular position of the crank shaft when 50 wt. % of the fuel mixture is combusted, the CA50 measured past a top dead center position of the crank shaft, and the CA50 being a function of the timing of the combustion by the spark plug;
      a target CA50 corresponds to a minimum in specific fuel consumption of the fuel mixture; and
      the spark plug initiates combustion at a time such that the internal combustion engine operates with an operational CA50 that is within 20 degrees of the target CA50.

2. The method of claim 1, wherein the amount of high octane fuel in the fuel mixture is within 20 wt. % of the minimum amount of high octane fuel needed to prevent knocking at the operational CA50.

3. The method of claim 1, wherein the operational CA50 is from 8 degrees to 35 degrees.

4. The method of claim 1, wherein the first fuel is injected by a port fuel injector into an intake port and the second fuel in injected by a direct fuel injector into the engine cylinder.

5. The method of claim 1, wherein the first fuel is injected by a direct fuel injector into the engine cylinder and the second fuel in injected by a port fuel injector into an intake port.

6. The method of claim 1, wherein the first fuel is injected by a direct fuel injector into the engine cylinder and the second fuel is injected by a direct fuel injector into the engine cylinder.

7. The method of claim 1, wherein the first fuel comprises one or more alcohols.

8. The method of claim 1, wherein the one or more alcohols are chosen from ethanol or methanol.

9. The method of claim 1, wherein the second fuel comprises a petroleum-based fuel.

10. The method of claim 9, wherein the petroleum-based fuel is gasoline.

11. The method of claim 1, wherein the timing of the combustion by the spark plug is retarded with respect to maximum brake torque timing.

12. The method of claim 1, wherein, relative to an identical engine operating with maximum break torque timing, one or more of:
the engine has decreased preignition;
the average peak pressure in the engine is decreased;
the engine operates without knocking with lesser high octane fuel;
the engine has increased mixing between air and fuel;
the engine has reduced fuel impingement in the cylinder; or
the engine has decreased wear.

13. An internal combustion engine comprising:
an engine cylinder;
a piston housed within the engine cylinder;
a crank shaft coupled with the piston;
a first fuel injector that injects a first fuel;
a second fuel injector that injects a second fuel, the second fuel comprising a greater octane rating than the second fuel, wherein the first fuel and the second fuel form a fuel mixture in a combustion zone of the engine cylinder; and
a spark plug that combusts the fuel mixture to translate the piston and rotate the crank shaft, wherein:
a CA50 is defined as the angular position of the crank shaft when 50 wt. % of the fuel mixture is combusted, the CA50 measured past a top dead center position of the crank shaft, and the CA50 being a function of the timing of the combustion by the spark plug;
a target CA50 corresponds to a minimum in specific fuel consumption of the fuel mixture; and
the spark plug initiates combustion at a time such that the internal combustion engine operates with an operational CA50 that is within 20 degrees of the target CA50.

14. The internal combustion engine of claim 13, wherein the amount of high octane fuel in the fuel mixture is within 20 wt. % of the minimum amount of high octane fuel needed to prevent knocking at the operational CA50.

15. The internal combustion engine of claim 13, wherein the operational CA50 is from 8 degrees to 35 degrees.

16. The internal combustion engine of claim 13, wherein the timing of the combustion by the spark plug is retarded with respect to maximum brake torque timing.

17. The internal combustion engine of claim 13, wherein the first fuel comprises one or more alcohols.

18. The internal combustion engine of claim 17, wherein the one or more alcohols are chosen from ethanol or methanol.

19. The internal combustion engine of claim 11, wherein the second fuel comprises a petroleum-based fuel.

20. The internal combustion engine of claim 18, wherein the petroleum-based fuel is gasoline.

21. The method of claim 1, wherein the minimum in specific fuel consumption is a function of a thermal efficiency of the internal combustion engine and an octane rating of the fuel mixture.

22. The method of claim 1, further comprising:
increasing an amount of the second fuel into the engine cylinder; and
retarding a spark timing at which the spark plug initiates combustion to maintain the operational CA50 within 20 degrees of the target CA50.

* * * * *